(12) United States Patent
Huang

(10) Patent No.: US 9,018,316 B2
(45) Date of Patent: Apr. 28, 2015

(54) FAST DEGRADABLE POLYESTER POLYMER AND PREPARATION METHOD AND USE THEREOF

(71) Applicant: Molecon (Suzhou) Novel Materials Co., Ltd., Jiangsu (CN)

(72) Inventor: Bin Huang, Fremont, CA (US)

(73) Assignee: Molecon (Suzhou) Novel Materials Co., Ltd., Jiangsu (CN)

( * ) Notice: Subject to any disclaimer, the term of this patent is extended or adjusted under 35 U.S.C. 154(b) by 0 days.

(21) Appl. No.: 14/350,513

(22) PCT Filed: Oct. 11, 2012

(86) PCT No.: PCT/CN2012/082770
§ 371 (c)(1),
(2) Date: Apr. 8, 2014

(87) PCT Pub. No.: WO2013/071802
PCT Pub. Date: May 23, 2013

(65) Prior Publication Data
US 2014/0275436 A1    Sep. 18, 2014

Related U.S. Application Data

(60) Provisional application No. 61/627,430, filed on Oct. 12, 2011.

(30) Foreign Application Priority Data

Oct. 8, 2012    (CN) .......................... 2012 1 0380279

(51) Int. Cl.
| | | |
|---|---|---|
| C08F 20/00 | (2006.01) |
| C08G 63/80 | (2006.01) |
| C08G 81/00 | (2006.01) |
| C08G 63/60 | (2006.01) |
| C08L 87/00 | (2006.01) |
| C08G 63/18 | (2006.01) |
| C08G 63/183 | (2006.01) |
| C08G 63/20 | (2006.01) |
| C08L 67/02 | (2006.01) |
| C08G 63/181 | (2006.01) |
| C08G 63/78 | (2006.01) |

(52) U.S. Cl.
CPC ................ *C08G 63/80* (2013.01); *C08G 81/00* (2013.01); *C08G 63/60* (2013.01); *C08L 87/005* (2013.01); *C08G 63/18* (2013.01); *C08G 63/183* (2013.01); *C08G 63/20* (2013.01); *C08L 67/02* (2013.01); *C08L 2203/10* (2013.01); *C08G 2230/00* (2013.01); *C08L 2201/06* (2013.01); *C08L 2203/16* (2013.01); *C08G 63/181* (2013.01); *C08G 63/78* (2013.01)

(58) Field of Classification Search
CPC .... C08G 63/18; C08G 63/181; C08G 63/183; C08G 63/20; C08G 63/60; C08G 63/78; C08G 81/00; C08G 2230/00; C08L 67/02; C08L 87/005; C08L 2201/06; C08L 2203/10; C08L 2203/16
USPC .......................................... 525/437, 448, 450
See application file for complete search history.

(56) References Cited

U.S. PATENT DOCUMENTS

2007/0155906 A1* 7/2007 Hissink et al. ................. 525/242
2011/0213100 A1* 9/2011 Huang et al. .................. 525/437

* cited by examiner

*Primary Examiner* — Robert Jones, Jr.

(57) ABSTRACT

A rapidly degradable polyester polymer and its preparation methods and applications are disclosed. The polyester polymer of the present invention is made by poly-condensation of repeat structure units, each of which consists of a non-degradable block A and degradable block B. The polyester polymer not only has good machinery processing performance, but also can be quickly degraded in appropriate of environment, thereby effectively resolve the environment pollution problems resulted in the used of polyester polymers. It satisfies the wide application demands and especially ensures such polymer can be used for beverage bottle, food package films, shopping bags and other food package containers. In addition, the method of preparation in present invention is simple, low-cost, and the raw materials are easily obtainable at low price. It is suitable for volume production and has practical value and application potentials.

19 Claims, 2 Drawing Sheets

FAST DEGRADABLE POLYESTER POLYMER AND PREPARATION METHOD AND USE THEREOF

FIELD OF THE INVENTION

The present invention relates to the preparation methods and applications of a rapid degradable polyester polymer. More particularly, the invention relates to the preparation and applications of condensation-type copolyesters by embedding with small biodegradable segments in the polymer main chains. It is belong to the field of functional polymer materials.

BACKGROUND OF THE INVENTION

Polyesters are the general name of the polymers prepared by condensation polymerization of polyol (poly alcohol) with poly acids. The typical polyester is aromatic polyester that is represented by polyethylene terephthalate (PET), which is widely used in various industries of fibers, packaging and others for its excellent chemical stability, proper mechanical properties and transparency and health performance. At present time, polyester production and sales growth momentum remains strong, especially in the field of packaging of carbonate drinks. With the breakthrough of research on polyester's resistance properties, the applications in the field of beer, food and cosmetic packaging will enlarge the market of polyesters. However, the polyester (PET) waste is difficult to degrade naturally in nature. In the environment of humidity of 45%-100%, and temperature of 20° C. the PET bottles can exists for 30-40 years, and its mechanical properties loss only 50%; at the same conditions, the polyester film can exists as long as 90-100 years. Therefore, the huge amount of polyester waste will bring us tremendous pressure to the environment.

Recycling polyester waste is a prioritized method used in the world because it can solve environmental problems and meanwhile fully utilize resources. Various recycling technologies have been developed for PET family recycling. The simple way to recycle polyester waste can be purified after the cleaning treatment, re-melting it and re-processing it into a relatively low-grade product, such as toys, detergent bottles: to re-produce high-grade polyester, the polyester need to be degraded, re-polymerized or used as chemical raw materials because the polyester is a poly-condensed macromolecular material. In addition, there are petroleumization technology, fuel recycling technology, incineration together with other waste, and other energy recycling technologies.

But recycling and re-utilization of polyester waste cannot become the final solution for environment pollutions. The first reason is the limitation of re-utilizing polyester waste, because it contains a lot of additives or other impurities that cannot be removed or it is regenerated polyesters already, thus it is very difficult to reutilize it. Secondly, many polyester products are not suitable to be collected and recycled, such as agriculture film, garbage bags, etc. Finally, it may not worth to recycle those products if they cost too much or are not valuable. Therefore, it is necessary to modify the degradability of such polyesters, make them degradable into small molecules in certain time at natural conditions and finally return back to the recirculation of nature.

It will be very beneficial for promoting polyesters long-term development if the lifetime of polyester in presence of nature can be effectively controlled and therefore avoid contamination of its environment, which makes PET-based polyester materials environment friendly.

The chemical factors may affect the degradability of materials include hydrophilicity, morphology, molecular mass, polymer composition, and etc. The stronger hydrophilicity of polymer is, the easier hydrolysis will be, and it also will favor to be biodegraded by micro-organism. Hydrolysis enzyme likes to attack ester bond, amide bond and amino carboxylic acid bond; the amorphous domains of polymer are easily to be damaged by water and micro-organism than the crystal domains of polymer to be. Polymers with soft chains and low glass-transition temperature are more easily to be degraded and the degradability of polymers increases with the decreasing of molecular weight of polymers. The composition of polymers, such as blend polymers and copolymer, also can affect its degradation performance.

PET polyester contains ester bonds which are easily to be damaged by micro-organism enzyme and water. At molten state, trace amount of moisture can cause rapid breaking of polyester bonds. In the processing and production of polyester, the moisture content of the resin must be strictly controlled. However, under normal conditions, PET polyester has good chemical stability; it is difficult to be degraded under natural conditions. This could be attributed to the regularity of structure of PET polymer main chain, and the aromatic rings contained in the main chain of PET. Existing of aromatic rings increased the polarity the polymer chains with regularity, which lower its flexibility and improve its crystallization performance. High crystallinity of polymer can play a role of resisting hydrolysis because the water molecules are blocked to enter crystallization phase. PET is half crystallized polymer, its initial stage of degradation occurs in those domains of amorphous with relative loose structure and the edges of half crystallized domains. The hydrolysis and breaking of molecular chain segments between micro-particles of crystal will result in molecular chains in amorphous further crystalline, making crystallinity obviously to increase, thereby hindering the occurring of further hydrolysis. On the other hand, increasing of rigidity of molecular chain will lower the moving activities of macromolecules. It could be characterized by a higher glass-transition temperature, and therefore reduces the sensitivity of polymers to hydrolysis. Therefore, unlike the molten status, solid-state degradation is a complex process which depends on activities of polymer chain and its penetrating capability.

Based on the above analysis for control factors of degradability of PET polyester, it is necessary to lower the crystallization capability and glass-transition temperature for improving degradability of PET polyester. The decrease of glass-transition temperature of polyester can also increase the mobility of polymer chain segments and reduce the energy needed for changing states, thereby increasing susceptibility to hydrolysis of polyester. Lower crystallinity can make water molecules or microbes effectively penetrate into material inner and attack its weak ester bond.

Ways to reduce PET crystallinity can be either through controlling the late stage of polymer materials processing, or through molecular design concept, in some extent to reverse the polarity of PET polymer to more rigid structured architecture. By introducing third structure unit that is flexible or contains specific functional group, the crystallization properties of PET can be changed radically. The methods to introduce third structure unit mainly are co-polymerization with addition of modifier and reactive blend with aliphatic polyesters.

Although it is clear theoretically the approaches for PET category aromatic polyesters, the applications are still very limited in practical production. As PET category polyesters are widely applied materials in the synthetic resin, studying its degradability may eliminate the impact of their waste on the environment, and it will be very meaningful for its long term development.

DETAILED DESCRIPTION OF THE INVENTION

In order to resolve above problems for existing technologies, the objective of the present invention is to provide one kind of rapid degradable polyester polymers and the preparation methods and applications thereof, in order to reach the goal of rapid degradation at special conditions for polyester polymers such as PET and resolve the environment pollution problems resulted from the application of such type of polymers.

For the purpose of above objectives of invention, the technical approaches used in the present invention are as following:

In one aspect, the present invention provide a kid of rapid degradable polyester polymers, with the repeat units consisting of non-degradable chain blocks A and degradable blocks B, obtained by condensation polymerization and these polyester polymers have formula of $-(AB)_n$; with characters as:

In some embodiments, the non-degradable blocks have a structure according to Formula (I):

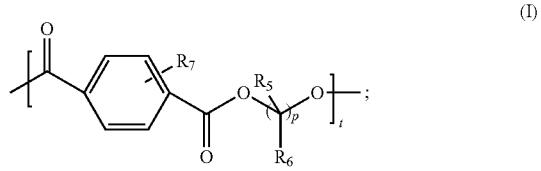

In some embodiments, the degradable blocks have a structure according to Formula (II):

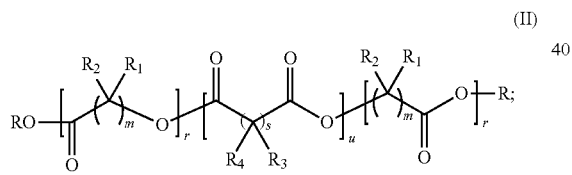

In some embodiments, the polyester polymers $-(AB)_n$ have a structure according to Formula (III):

wherein p, m, s, r and u are integers greater than 0 but smaller than 11;

t is an integer greater than 1 but smaller than 31;

n is an integer greater than 1;

R, $R_1$, $R_2$, $R_3$, $R_4$, $R_5$, $R_6$, $R_7$ are members independently selected in each of the structural units from H, substituted or un-substituted alkyl, substituted or un-substituted heteroalkyl, substituted or un-substituted cycloalkyl, substituted or un-substituted heterocycloalkyl, substituted or un-substituted aryl and substituted or un-substituted heteroaryl, substituted or un-substituted alkoxy, ester, nitro, amine, amide, or thiol.

In some embodiments, R, $R_1$, $R_2$, $R_3$, $R_4$, $R_5$, $R_6$, are independently selected in each of the structural units from H or $C_1$-$C_{10}$ alkyls; $R_7$ is selected from H, substituted or un-substituted alkyl, substituted or un-substituted heteroalkyl, substituted or un-substituted cycloalkyl, substituted or un-substituted heterocycloalkyl, substituted or un-substituted aryl.

In some embodiments, R, $R_1$, $R_2$, $R_3$, $R_4$, $R_5$, $R_6$, are independently selected in each of the structural units from H or methyl, ethyl, propyl, isopropyl, butyl, isobutyl, tert-butyl; $R_7$ is selected from H, substituted or un-substituted alkyl, substituted or un-substituted heteroalkyl, substituted or un-substituted cycloalkyl, substituted or un-substituted heterocycloalkyl.

In some embodiments, the R is methyl; $R_1$, $R_2$, $R_3$, $R_4$, $R_5$, $R_6$, $R_7$ are H; p=2; m and s are any integer independently selected from 1, 2, 3, 4, 5; t is an integer greater than 1 but smaller than 31; r=1 or 2; u=1 or 2; and n is an integer greater than 2.

In another aspect, the present invention provides a preparation method for manufacturing rapid degradable polyester polymers as following:

a) Organic Synthesis of degradable blocks B:

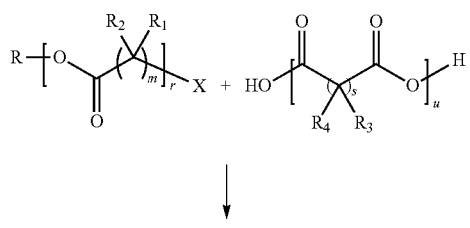

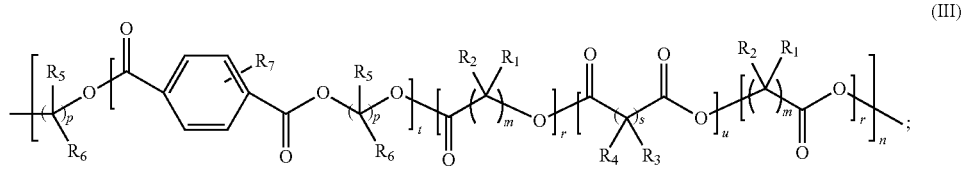

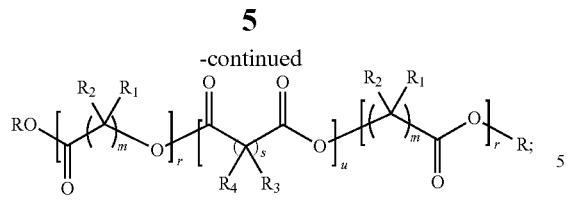

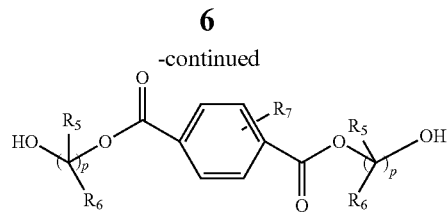

b) Condensation polymerizing non-degradable blocks A and degradable blocks B through solution polymerization or bulk polymerization:

In some embodiments, another preparation method of making rapid degradable polyester polymers is as follows:

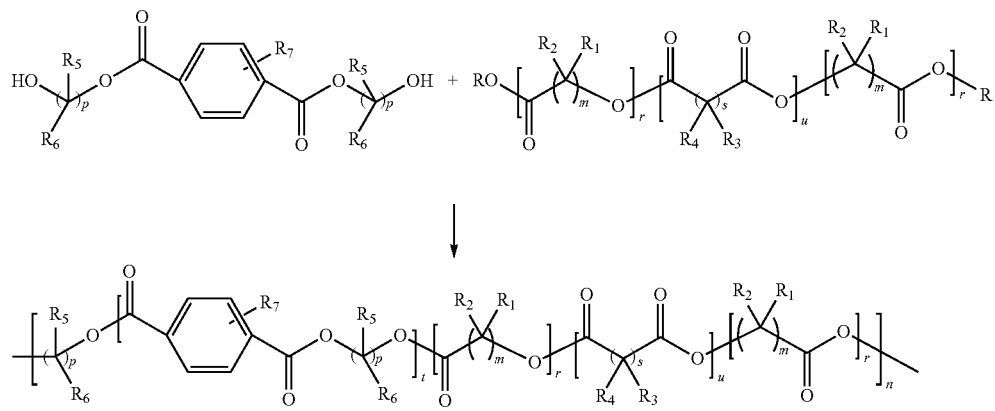

where the definition of R, $R_1$, $R_2$, $R_3$, $R_4$, $R_5$, $R_6$, $R_7$ and p, m, s, r, u, t, n are the same as above; X is selected from Cl, Br, I, $NH_2$ or OH.

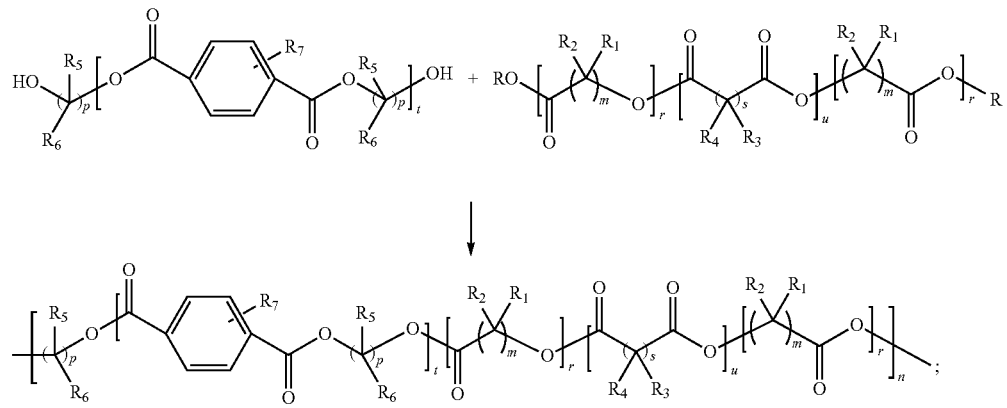

In some embodiments, the synthesis of non-degradable blocks A consists of following steps:

where the definition of R, $R_1$, $R_2$, $R_3$, $R_4$, $R_5$, $R_6$, $R_7$ and p, m, s, r, u, t, n are the same as above.

In further embodiments, synthesis of

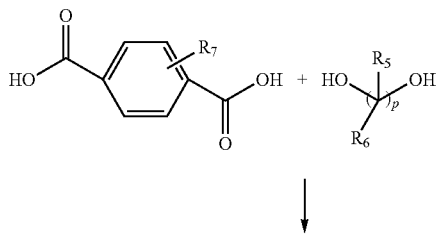

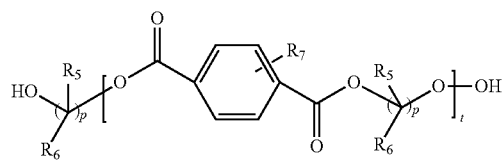

includes the following steps:

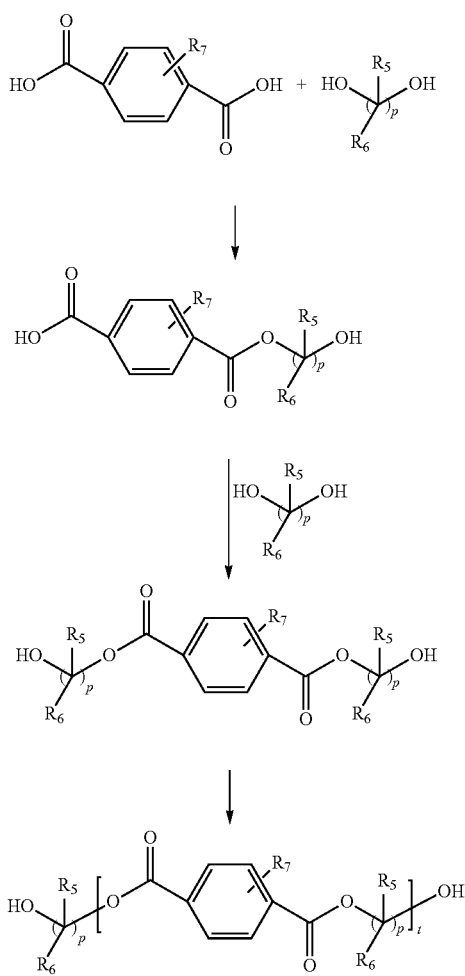

In order to ensure the degradable blocks to be distributed evenly along the polymer main chains, the non-degradable blocks or oligmers will be synthesized first through melting condensation polymerization (e.g. react under vacuum at 240-290° C. for 2-7 hours), then the degradable blocks are added to continue the melting condensation polymerization (e.g. continue the reaction under vacuum at 240-290° C. for 2-7 hours).

To obtain higher molecular weight polymers, it is achievable as long as the moles of non-degradable blocks are larger than the moles of degradable blocks. Because the ethylene glycol in the excessive amount of non-degradable blocks can be removed under vacuum at high temperature, a self-condensation polymerization to form high molecular polymers is possible.

Compare to the existing technologies, the polyester polymers disclosed in present invention embraced different structured degradable blocks along the polymer main chains and therefore reduced its crystallinity, make its melting temperature much lower than that of regular polyester polymers. In addition, due to embraced degradable blocks, soft segments of polymer become longer, and the glass-transition temperature of the polymer is lower than that of regular polyester polymers also. Thus, the polyester polymers of the present invention not only have excellent processing properties, but also can be degraded quickly into many short non-degradable chains in proper environment (such as alkaline solutions), followed by further complete degradation of non-degradable short segments. It effectively resolved the problems of environment pollution resulted from applications of such kind of polymers and satisfied the need of wide applications of such kind of polymers. Especially, it can ensure such kind of polymers be used for beverage bottle, food package film, shopping bags and other food package containers. In addition, the method of preparation in present invention is simple, low-cost, and the raw materials are easy to be obtained at low price. It is suitable to volume production and has practical value and application potentials.

EMBODIMENTS

Figure 1:
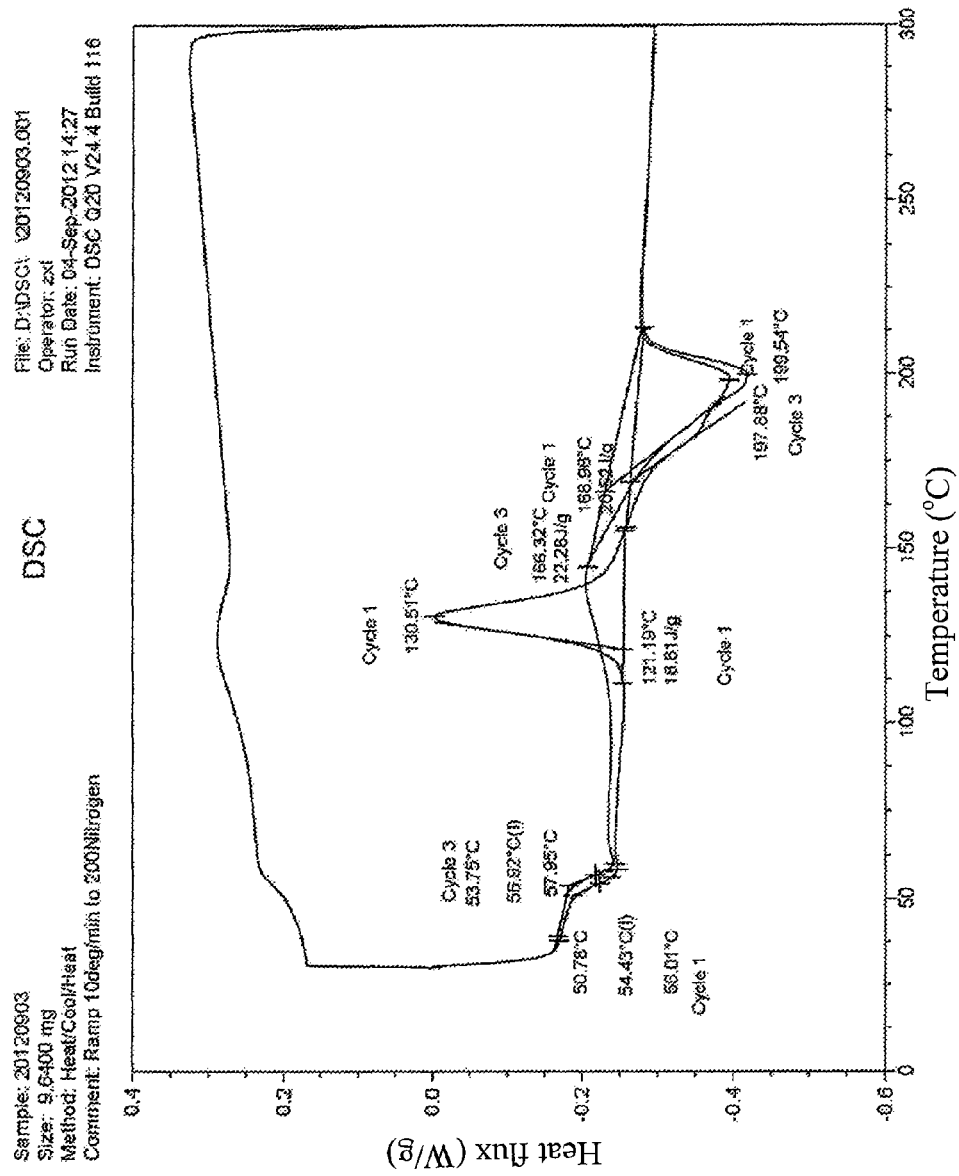
FIG. 1 is the DSC curve for polyester mPET(MeGSGMe) prepared in example 1.

The following examples are detailed demonstrations of present invention. All of the following experiment methods in all examples are regular experiment methods, except specially commented. All chemicals and materials are commercially obtained except specially commented.

The methods of chemical analysis and analytical instruments in present invention are described as following:
1. Determination of Intrinsic Viscosity (IV)
Industry standard method for determination of the PET: according to the society of the plastics industry (SPI's) on standard measurements of PET polymer in phenol/1,1,2,2-four chloroethane (60:40 by weight) mixed solution, with Ubbelohde viscometer, temperature for determination is 25° C.

The degree of polymerization of PET is calculated by following formula:

$$DP_n = 1.19 \times IV - 7;$$

where the unit for IV is dL/g, therefore the chain length of polyesters of the present invention will be calculated in same methods.
2. Chemical Composition and Structure
The chemical structures in present invention are determined by NMR at temperature of 20° C. in solution with D substituted chloroform solvent ($CDCl_3$).
3. Thermal Properties Measurements
The thermal properties of polyester polymers prepared in the present invention are measured with Differential scanning calorimeter (DSC) Q20, manufactured by TA Instruments.
4. Degradation Measurements
The degradation measurement is weight loss percentage of polyester polymers prepared in present invention in 5% NaOH aqueous solution at 100° C. with stirring for n hours.
5. Mechanical Property Test
Measurement of tensile strength is performed by Shanghai Institute of Organic Chemistry, Academia Sinica, according to ASTMD638-97 standard methods.

Example 1

1. Synthesis of Degradable Block di-(methyl hydroxyacetate)succinat(MeGSGMe)

To a solution of succinic acid (23.62 gram, 0.20 mole) and triethylamine (56 ml, 0.4 mole) in anhydrous acetonitrile (50 ml), add drop-wise methyl bromoacetate (73.43 g, 0.48 mole). The solution is stirred at room temperature for 5 hours and 100 ml more of anhydrous acetonitrile is added when the white precipitate shows up. After 24 hours reaction the solution is filtrated to remove ammonium salt and the solvent acetonitrile is removed in vacuum. The residue is under vacuum (3 mmHg) at 50° C. for 16 hours to remove extra methyl bromoacetate. The residue then is dissolved in ethyl acetate (200 ml) and washed with DI water to remove trace amount of ammonium. The solvent was removed in vacuum after dried with $MgSO_4$ and 41.43 gram solid degradable block, MeGSGMe, is collected, yield: 79%. $^1$HNMR ($CDCl_3$, 400 Mz) δ 4.66 (D, 4H); δ 3.77 (S, 6H); δ 2.80 (T, 4H).

2. Synthesis of Polyester Polymers of the Present Invention

Bis(2-hydroxyethyl)terephthalate (BHET, 71.19 gram,) and di-(methyl hydroxyacetate)succinate (degradable blocks MeGSGMe, 10.49 gram) (repeat unit molar ratio for BHET: MeGSGMe is 7:1) and 0.01 wt % $Sb_2O_3$ are placed in a stainless steel pressure reactor with a magnetic stirring bar and N2/vacuum purged three times and the vacuum is reduced to about 2 mmHg. The system is placed in a 275° C. oil bath for 5 hours with stirring under vacuum. Dry ice is added to cool down the melt to room temperature quickly. 57.2 gram solid is collected and that is the rapid degradable polyester polymer described in the present invention, named as: mPET (MeGSGMe). The bulk solid is roughly grinded into small pieces and the intrinsic viscosity is measured in phenol/1,1,2,2-tetrachloroethane (60/40 weight ratio) according to SPI's (The Society of Plastic Industry) standard PET measurement procedure.

FIG. 1 is the DSC measurement (temperature raised at 10° C./min) for the above synthesized polymer and shows its thermal properties. It can be observed that the glass-transition temperature of the new polymer is 56° C., melting temperature is 216° C., the re-crystallization temperature during temperature rising is 121° C. FIG. 1 shows, due to the different structured degradable blocks which are embraced in polymer main chains, the crystallinity of the polyester polymers obtained in the present invention is reduced, and its melting temperature is much lower than that of regular PET. In addition, due to the embracement of degradable blocks, the soft segments of polyester chains are longer, that makes the glass-transition temperature of the polyester according to the present invention lower than that of regular PET.

The intrinsic viscosity of obtained polymer is measured as 0.57 dL/g in phenol/1,1,2,2 four chloroethane (60:40 weight ratio), based on the standard measurement method of Society of Plastic Industry (SPI) for PET.

In addition, the calculation based on B. Gantillon's formula shows the degree of polymerization for polyester synthesized in this example is equal to $$DP_n = 1.19 \times IV - 7 = 1.19 \times (0.57 \times 100) - 7 = 61$$

the degree of polymerization for regular PET.

According to ASTMD638-97 standard, the Young's module for the polymer synthesized in this example is measured as 910 Mpa, the tensile stress is 57 MPa.

Figure 2:
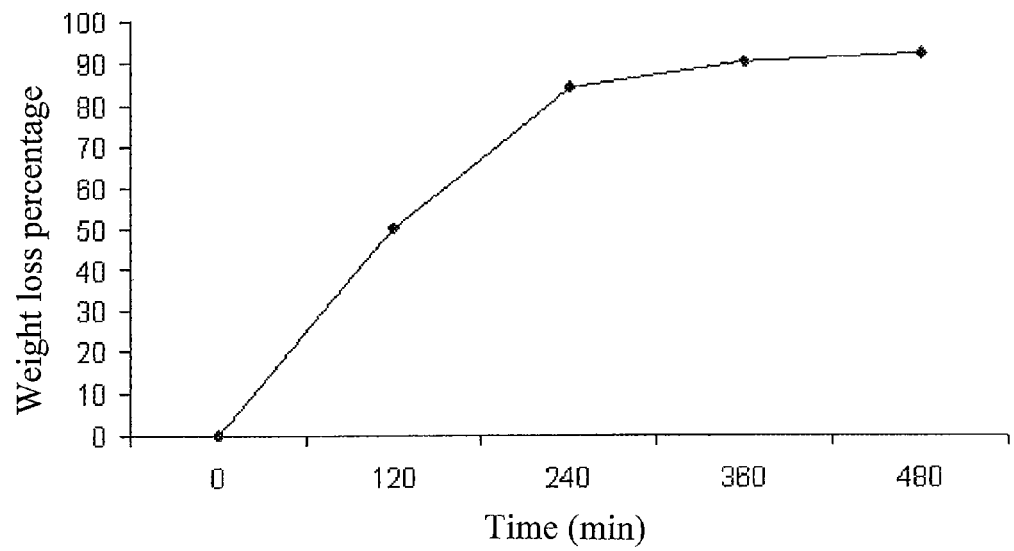
FIG. 2 is the degradation curve for polyester mPET (MeGSGMe) prepared in example 1.
Figure 3:
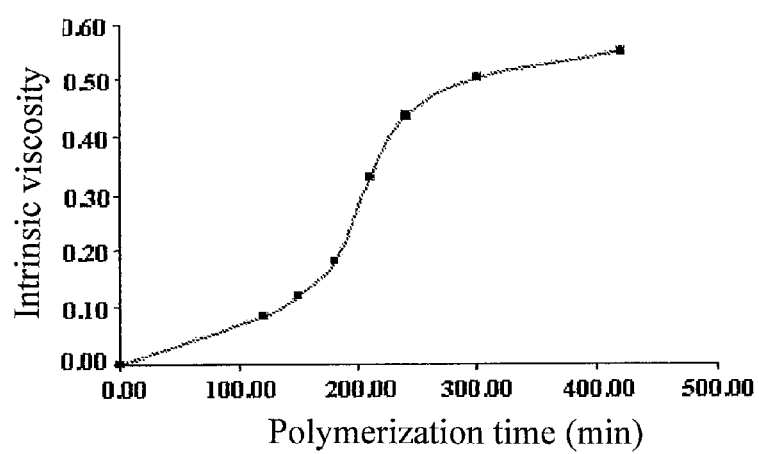
FIG. 3 is the relationship of intrinsic viscosity vs polymerization time for PET oligmers prepared in example 2.

FIG. 2 shows the weight loss of synthesized polyester polymer at 100° C., 5% NaOH aqueous solution with stirring for n hours. From the figure it can be seen that the weight loss percentage of the polymer synthesized in this example reaches 49.78% after 120 minutes, 83.84% after 240 minutes, 92.24% after 480 minutes. This further demonstrates the rapid degradability of polyester polymer synthesized in the present invention at given conditions.

Example 2

1. Synthesis of Degradable Block

MeGSGMe

To a solution of succinic acid (23.62 g, 0.20 mol) and triethyl amine (84 mL, 0.6 mol) in methylene chloride (50 mL), add drop-wise methyl chloroacetate (65.11 g, 0.6 mol) and stirred at room temperature for 5 hours. When white precipitate appears, methylene chloride (100 mL) was added. The solution is stirred for 24 hours then the solid is removed through filtration. The filtrate was washed with water to remove residue amine, dried with anhydrous $MgSO_4$. The solvent $CH_2Cl_2$ was removed in vacuum and 47.20 g solid, degradable block: MeGSGMe, is obtained; yield 90%.

$^1$HNMR ($CDCl_3$, 400 Mz) δ 4.66 (D, 4H); δ 3.77 (S, 6H); δ 2.80 (T, 4H).

2. Synthesis of Non-Degradable Blocks

PET Oligmer

Bis(2-hydroxyethyl)terephthalate (BHET, 100 gram, 0.393 mol) and $Sb_2O_3$ (0.02 gram) was placed in a 250 mL pressure reactor, purged with nitrogen gas three times and then was heated under vacuum for 45 minutes to 275° C.; the system is maintained under 3 mmHG vacuum at 275° C. for a various time period (2-7 hours), to obtain different PET oligmers with various viscosity. The obtained PET oligomers are measured for intrinsic viscosities in phenol/1,1,2,2 four chloroethane (60:40 weight ratio) mixed solution. FIG. 4 shows the co-relationship of intrinsic viscosity of PET oligomer vs polymerization time.

3. Synthesis of Polyester Polymers According to the Present Invention

The degradable blocks synthesized in step 1 is added into the PET oligomers synthesized in step 2 and then continue to polymerize at 275° C. for 1-3 hours and terminated at the given degree of polymerization (intrinsic viscosity). According to this method, polymers with different mole ratio of degradable blocks/non-degradable blocks=1:5, 1:7, 1:9 and so on can be synthesized (i.e. t=5, 7, 9 . . . etc).

Table 1 is the results of mechanical property test for polymers in this example according to degradable blocks/non-degradable blocks mole ratio 1:5, 1:7, 1:9.

TABLE 1

Characterization Results for Various Polymers

| degradable blocks/non-degradable blocks | IV (dL/g) | Tg (° C.) | Tm (° C.) | Young's Module (MPa) | Tensile Stress (MPa) |
|---|---|---|---|---|---|
| 1:5 | 0.61 | 54 | 199 | 890 | 57.5 |
| 1:7 | 0.57 | 56 | 216 | 910 | 57.0 |
| 1:9 | 0.713 | 63 | 213 | 930 | 57.5 |

In summary, the polyester polymers provided by the present invention not only have excellent mechanical processing properties but also can be rapidly degraded at proper environment (such as alkaline solution) and therefore effectively resolve the environment pollution problems caused by this kind of polymers. It satisfied the wide application demand and especially it ensured such kind of polymers can be use for beverage bottle, food package film, shopping bag and other food package containers. In addition, the method of preparation in present invention is simple, low-cost, and the raw materials are easy to be obtained at low price. It is suitable to volume production and has practical value and application potentials.

Finally, it is necessary to claim here: the above examples are only used to further detail the technical demonstration of the invention, cannot be understand as limitations on the scope of the invention protected, anyone in this field makes any non-essential improvements and adjustments based on the contents of the invention will fall into the scope of protection of the invention.

What is claimed is:

1. A polymer or copolymer having a form of $-(AB)_n$ made from poly-condensation of blocks A and blocks B in repeated structure units, wherein the block A has a structure of Formula (I):

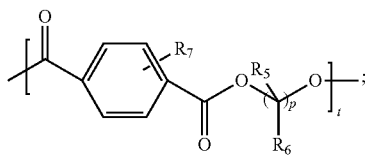

the block B has a structure of Formula (II):

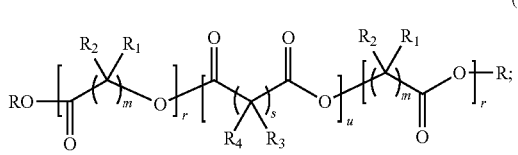

and the polymer or copolymer $-(AB)_n$ has a structure of Formula (III):

wherein
p, m, s, r and u are integers greater than 0 but smaller than 11;
t is an integer greater than 1 but smaller than 31;
n is an integer greater than 1; and
R, $R_1$, $R_2$, $R_3$, $R_4$, $R_5$, $R_6$, $R_7$ in each of the structural units are independently selected from H, substituted or un-substituted alkyl, substituted or un-substituted heteroalkyl, substituted or un-substituted cycloalkyl, substituted or un-substituted heterocycloalkyl, substituted or un-substituted aryl and substituted or un-substituted heteroaryl, substituted or un-substituted alkoxy, ester, nitro, amine, amide, or thiol.

2. The polymer or copolymer according to claim 1, wherein R, $R_1$, $R_2$, $R_3$, $R_4$, $R_5$, $R_6$ in each of the structural units are independently selected from H or $C_1$-$C_{10}$ alkyls;
$R_7$ is selected from H, substituted or unsubstituted alkyl, substituted or unsubstituted heteroalkyl, substituted or unsubstituted cycloalkyl, substituted or unsubstituted heterocycloalkyl, substituted or unsubstituted aryl.

3. The polymer or copolymer according to claim 2, wherein R, $R_1$, $R_2$, $R_3$, $R_4$, $R_5$, $R_6$ in each of the structural units are independently selected from H or methyl, ethyl, propyl, isopropyl, butyl, isobutyl, tert-butyl;
$R_7$ is selected from H, substituted or unsubstituted alkyl, substituted or unsubstituted heteroalkyl, substituted or unsubstituted cycloalkyl, substituted or unsubstituted heterocycloalkyl.

4. The polymer or copolymer according to claim 2, wherein R is methyl;
$R_1$, $R_2$, $R_3$, $R_4$, $R_5$, $R_6$, $R_7$ are H;
p=2;
m and s are any integer independently selected from 1, 2, 3, 4 or 5;
t is an integer greater than 1 but smaller less than 31;
r=1 or 2;
u=1 or 2; and
n is an integer greater than 2.

5. A method of making a polymer or copolymer according to claim 1, comprising the step of poly-condensation of the blocks A with the blocks B through solution polymerization or melting polymerization as follows:

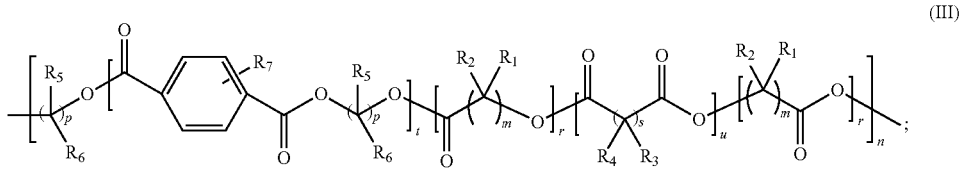

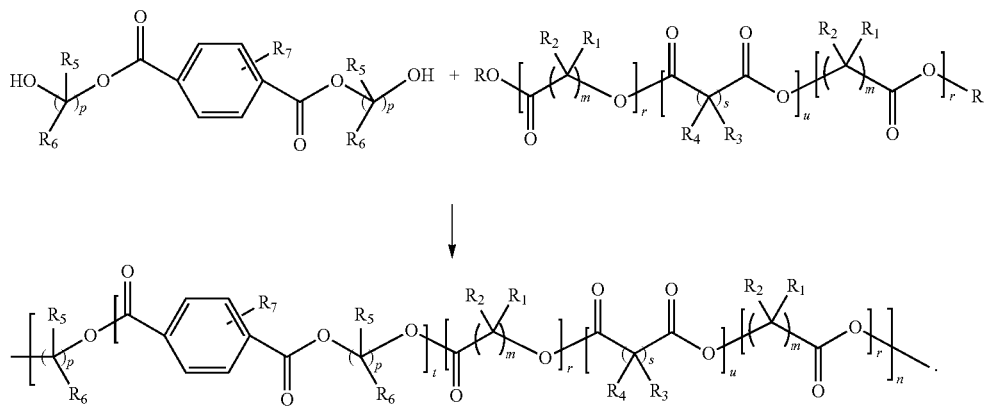
6. The method according to claim 5, further comprising the step of synthesizing the block B as follows:
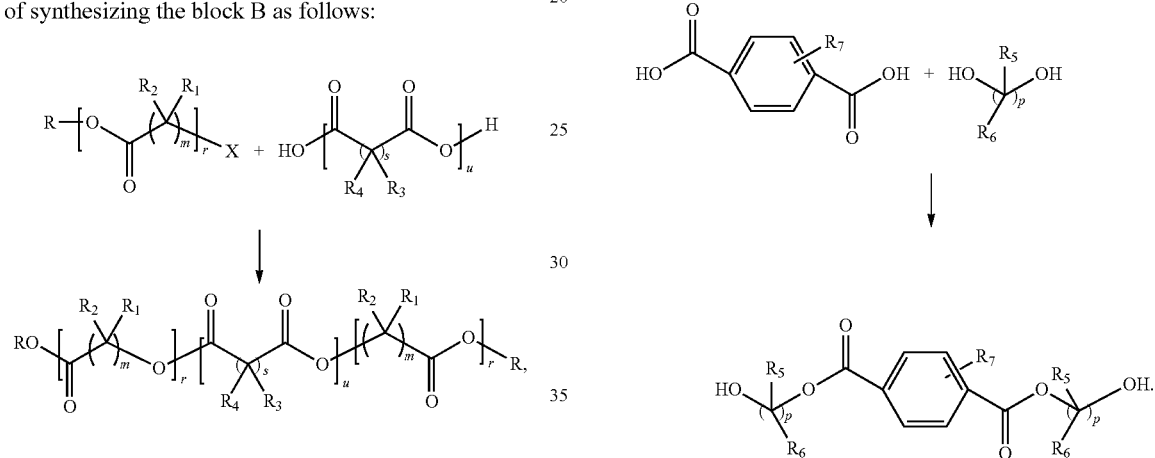
wherein X is selected from Cl, Br, I, NH$_2$ or OH.
7. The method according to claim 5, further comprising the step of synthesizing the block A in each structural unit as follows:
8. A method of making the polymer or copolymer according to claim 1, comprising the step of:
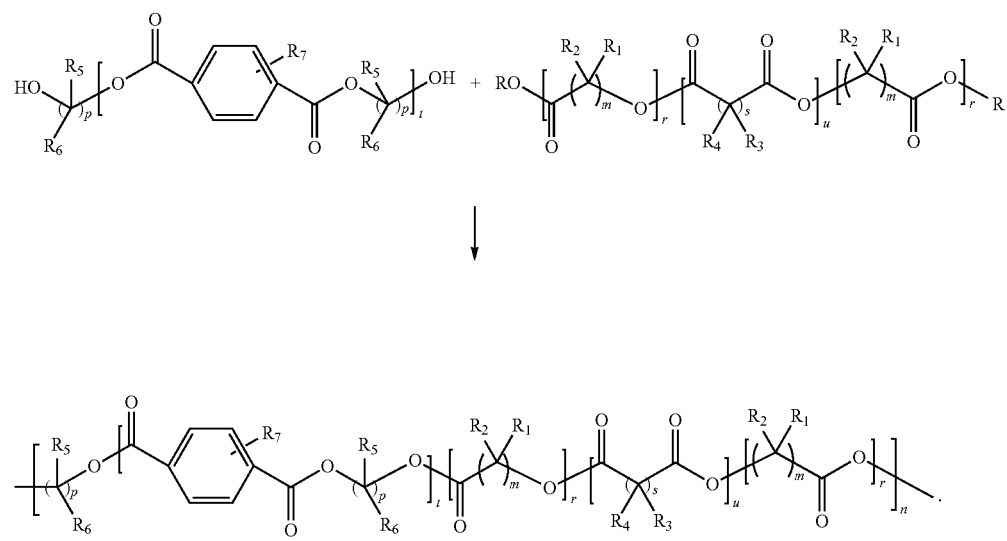

9. The method according to claim 8, further comprising the step of synthesizing

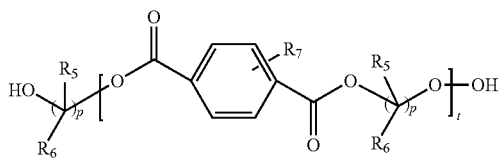

as follows:

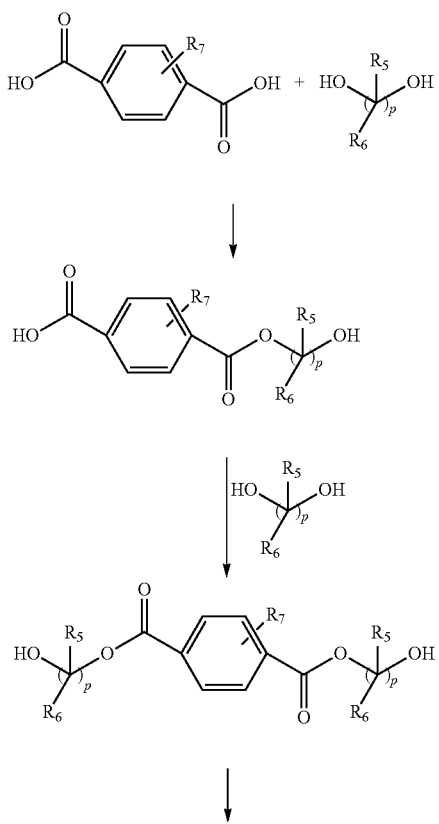

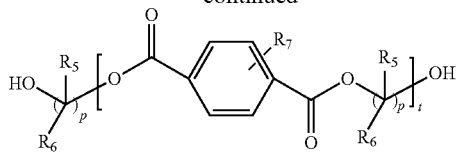

10. The method according to claim 5, wherein the blocks B are synthesized through melting condensation polymerization and the blocks A are then added to the blocks B to continue, the melting condensation polymerization.

11. The method according to claim 8, wherein the blocks B are synthesized through melting condensation polymerization and the blocks A are then added to the blocks B to continue, the melting condensation polymerization.

12. The method according to claim 10, wherein the melting condensation polymerization is carried out at 240-290° C., under vacuum for 2-7 hours.

13. The method according to claim 11, wherein the melting condensation polymerization is carried out at 240-290° C., under vacuum for 2-7 hours.

14. The method according to claim 5, wherein the hydroxyl moles contained in the blocks B are greater than the hydroxyl moles contained in the blocks A.

15. The method according to claim 8, wherein the hydroxyl moles contained in the blocks B are greater than the hydroxyl moles contained in the blocks A.

16. The method according to claim 10, wherein the hydroxyl moles contained in the blocks B are greater than the hydroxyl moles contained in the blocks A.

17. The method according to claim 11, wherein the hydroxyl moles contained in the blocks B are greater than the hydroxyl moles contained in the blocks A.

18. A product containing a polymer or copolymer according to claim 1.

19. The product according to claim 18 is a beverage package bottle, food package films, shopping bags, or other food containers.

* * * * *

UNITED STATES PATENT AND TRADEMARK OFFICE
CERTIFICATE OF CORRECTION

| | | |
|---|---|---|
| PATENT NO. | : 9,018,316 B2 | Page 1 of 1 |
| APPLICATION NO. | : 14/350513 | |
| DATED | : April 28, 2015 | |
| INVENTOR(S) | : Bin Huang et al. | |

It is certified that error appears in the above-identified patent and that said Letters Patent is hereby corrected as shown below:

On the title page item 72, please add the following two inventors:

Hyo LEE, Pleasanton, CA
John VAUGHN, Pacifica, CA

Signed and Sealed this
Second Day of February, 2016

Michelle K. Lee
*Director of the United States Patent and Trademark Office*